Aug. 16, 1927.

P. F. RICHARDS 1,639,058

HYDRAULIC BRAKE

Filed June 18, 1926

Inventor:
Pierce F. Richards,
by Fisher, Towle, Clapp & Soans
Attys.

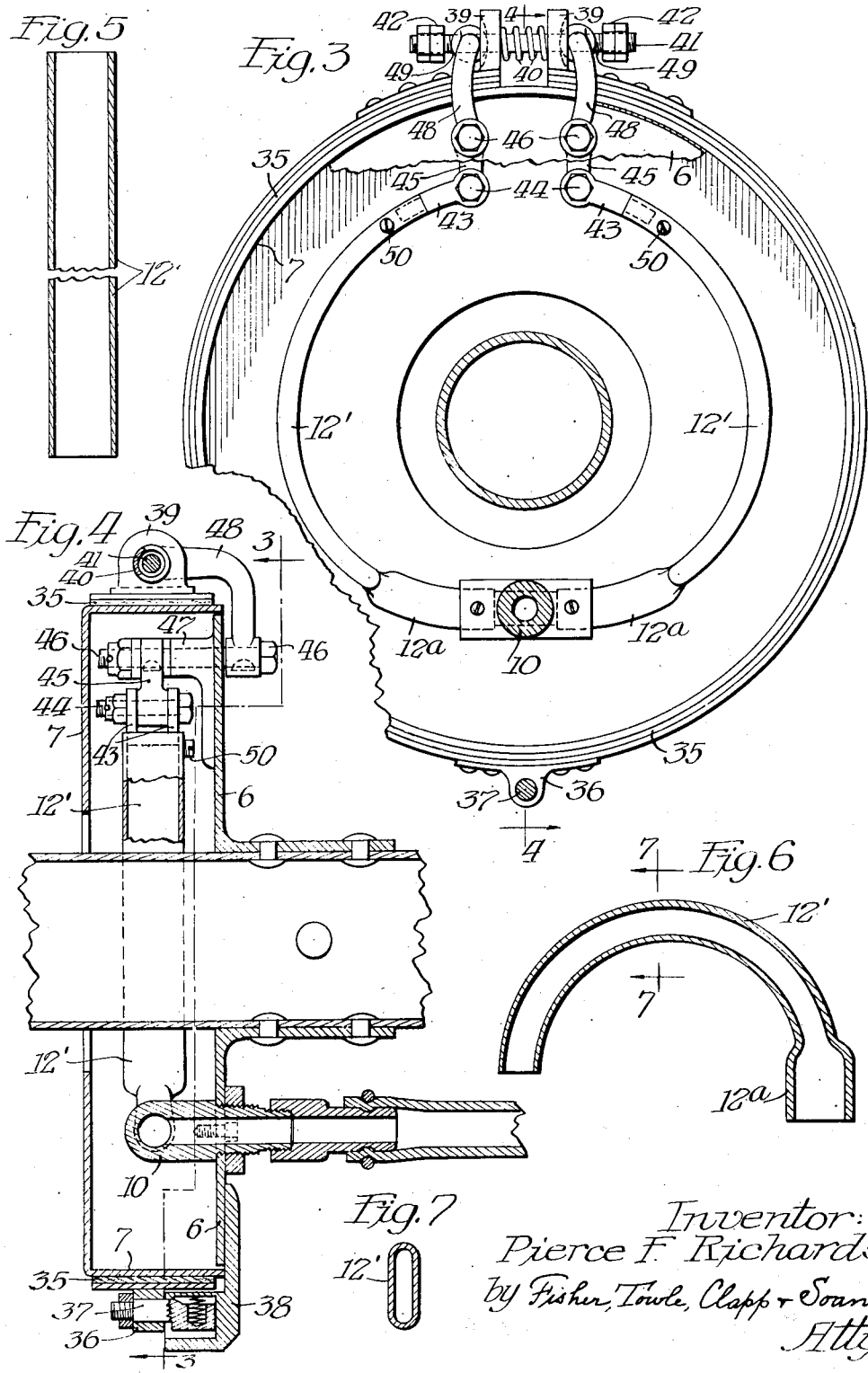

Patented Aug. 16, 1927.

1,639,058

UNITED STATES PATENT OFFICE.

PIERCE F. RICHARDS, OF CHICAGO, ILLINOIS, ASSIGNOR OF ONE-HALF TO L. L. VALENTINE, OF CHICAGO, ILLINOIS.

HYDRAULIC BRAKE.

Application filed June 18, 1926. Serial No. 116,807.

This invention relates to hydraulic brakes, and in its chief intended application has been designed for use on automobiles, with more especial reference to the rear or traction wheels.

One object of the invention is to provide a very simple, efficient and easily manipulated hydraulic brake well adapted to automobile brake equipment, and readily capable of operation through the agency of the usual brake pedal. Another object is to provide a hydraulic brake that, in its construction, will do away with the use of cylinders, pistons, plungers, packings and stuffing boxes commonly employed in hydraulic brakes, which are expensive to manufacture, troublesome to maintain in good working order, and liable to leakage. Still another object is to provide a hydraulic brake of the general type employing internal brake shoes or an external brake band co-operating with the usual brake drum attached to the wheel, and wherein the expansive force of the brake shoes or the contracting force of the band may be obtained through the use of a mechanism employing the principle of the well-known Bourdon tube quite commonly employed in pressure gages to actuate the pointer of the gage through a movement of the tube induced by internal pressure. Another object is to provide a brake that will be free from the "chattering" that frequently occurs in the application of mechanical brakes.

Still other objects and attendant advantages of the invention will be apparent to persons skilled in the art as the same becomes better understood by reference to the following detailed description, taken in connection with the accompanying drawings wherein I have illustrated practical and approved forms of the invention as applied to brakes of both the internal and external types, and wherein—

Fig. 1 is an inner or rear elevation of a traction wheel brake embodying the invention, partly in section on the line 1—1 of Fig. 2;

Fig. 2 is a vertical section taken on the line 2—2 of Fig. 1, and also showing in elevation, and partly in section, pedal-operated mechanism for creating the fluid pressure in the Bourdon tubes of the brake;

Fig. 3 is a view similar to Fig. 1, showing the principle of the invention embodied in a brake of the external band type, taken on the line 3—3 of Fig. 4;

Fig. 4 is a vertical axial section taken on the line 4—4 of Fig. 3;

Fig. 5 is a longitudinal axial section of the preferred form of expansion tube before shaping or flattening;

Fig. 6 is a similar section of the tube after shaping and flattening; and

Fig. 7 is a cross-section on the line 7—7 of Fig. 6.

Referring first to the embodiment of the invention illustrated in Figs. 1 and 2, 5 designates a section of the rear axle of an automobile, to which is rigidly attached the usual brake support plate 6. 7 designates the usual brake drum which in practice is bolted to the inner side of the wheel, and which is disposed laterally opposite to the brake support plate 6. In the lower portion of the brake support plate 6 is secured a stud 8 that projects into the drum 7 and constitutes a pivot pin for a pair of approximately semi-circular brake shoes 9 that lie opposite and substantially conform to the inner periphery of the drum. When the brake is applied the shoes 9 are forced outwardly into frictional engagement with the inner periphery of the drum through the novel fluid pressure expansion mechanism next to be described.

10 designates as an entirety a tubular T-coupling member formed with a depending arm 11 that has a square aperture fitting a squared portion 8' of the stud 8, whereby the coupling is rigidly supported within the drum. Into the opposite ends of the head of the T-coupling 10 are tightly fitted the lower ends of a pair of curved expansion tubes 12, having the form and action of Bourdon tubes, that lie against the inner faces of the brake shoes 9 and are formed with closed upper ends. The hollow stem of the T-coupling 10 is threaded into a nipple 13 that extends through a hole in the plate 6 and is itself connected to a line of tubing 14 leading into the bottom of a corrugated metal bellows 15, technically known as a sylphon, this latter being housed in a casing 16 and equipped on its upper end with a presser plate 17. This plate is formed with a central stem 18 projecting through a central aperture in the lid or cover of the casing 16, and operable by a foot pedal 19 through the intermediary of a pair of co-operating elbow levers 20 and 21 as clearly shown in Fig. 2. The system may be filled with oil or other liquid through registering holes 22, 23 in the casing cover and the presser plate 17, and through a pour hole 24 in a lug 25 on the under side of the top wall of the bellows; the pour hole 24 being normally plugged by a screw 26. The bellows 15 is normally expanded by an internal thrust spring 27.

When pressure is applied to the pedal 19, the liquid in the system is placed under pressure, and the expansion tubes tend to straighten, under the well-known principle of the Bourdon tube, and this action forces the brake shoes into frictional contact with the inner periphery of the brake drum. I have found in practice that this operation is entirely free from the chattering that often accompanies the sudden application of brake shoes or bands.

When the pressure on the system is relieved, the brake shoes are positively drawn out of contact with the drum into normal idle position by a simple retracting mechanism such as that shown in the upper portion of Figs. 1 and 2, whereby 28 designates a stud secured in the plate 6 and projecting into the plane of the brake shoes and formed on its inner end with a horizontal sleeve 29 in which is slidably mounted a threaded crosspin 30, the oppositely extending halves of which are passed through holes in internal lugs 31 formed on the meeting ends of the brake shoes. On the ends of the pin are abutment washers 32, between which and the outer faces of the lugs 31 are interposed compression springs 33 which manifestly act to force the inner ends of the shoes toward each other when the pressure in the expansion tubes is relieved, thus freeing the brake shoes from contact with the drum. Equality of action of the two brake shoes may be secured by endwise adjustment of the pin 30, this being effected by adjusting nuts 34 thereon bearing against opposite ends of the sleeve 29.

The same broad principle is embodied in the external friction band type of brake illustrated in Figs. 3 and 4. This construction embodies substantially the same brake-supporting plate, brake drum, and pressure-applying and conducting agencies as those previously described. In this structure 35 designates the brake band encircling the periphery of the brake drum 7, and mounted on the brake-supporting plate 6 through the agency of a hinge lug 36 attached to its lower side and mounted on a stud 37 secured in the foot of a bracket 38 attached to the lower portion of the plate 6 and partially underlying the periphery of the drum. To the adjacent ends of the brake band are attached the usual pinch lug 39 normally forced apart by a compression spring 40 that encircles a pin 41 passed through the lugs 39 and equipped with adjusting nuts 42 on its ends. 12' designates the expansion tubes which, in this instance, are shown as flattened or of oval cross-section, this being the most efficient form of the Bourdon tube. The upper ends of the tubes 12' are closed by plugs 43, the adjacent ends of which are forked and apertured for pivotal connection, through pivot bolts 44, with lever arms 45 fast on fulcrum shafts 46 journaled in bearing bosses 47 on the inner face of the plate 6. Keyed to the projecting ends of the shafts 46 are upwardly extending curved lever arms 48 carrying on their upper end rollers 49 bearing on the outer sides of the pinch lugs 39. In this construction, when pressure is applied to the fluid filling the expansion tubes 12', the expanding movement of the latter creates, through the described levers, a powerful compressive action on the pinch lugs of the brake band thus applying the latter to the drum. When this pressure is relieved, the reaction of the spring 40 frees the brake band from frictional contact with the drum and allows the latter to run free. Near the upper ends of the tubes 12' are tapped vent apertures normally closed by screws 50, which latter are withdrawn when the system is filled with oil to allow escape of air, and are then replaced.

From the foregoing it will be seen that the invention entirely dispenses with the customary pistons, plungers, stuffing boxes, and like devices, which soon become worn and leaky under the high pressures involved in a device of this character, and employs in lieu thereof, as exemplified in the corrugated metal bellows and the expansion tubes, fluid pressure creating and transmitting devices that do away with joints between relatively sliding parts.

In Figs. 5, 6 and 7 I illustrate a preferred construction of expansion tube. Fig. 5 is a longitudinal section of the tube before shaping; and as shown therein and in Fig. 6, the walls of the tube are formed with a longitudinal taper, being thickest at the anchor end and gradually diminishing in thickness to the free end. The shank portion 12ª, which is fitted into the T-coupling is left round, and the remaining portion of the tube is flattened to an oval form in cross-section as shown in Fig. 7. This form of expansion tube may, of course, be employed in the structure shown in Figs. 1 and 2, the end of the tube being closed by a suitable plug. I have found that a tube of this construction is more lively in action than a tube wherein the walls are of uniform thickness, whether made of round or oval cross-section.

It should be understood that the simple embodiments of the invention herein presented by no means exhaust the structural possibilities of the broad principle thereof; and hence the invention is not to be understood as limited to the structural details and arrangements shown and described, but may make use of such variations, modifications and mechanical equivalents as fall within the spirit and purview of the claims.

I claim—

1. In a hydraulic brake, the combination of co-operating rotatable and non-rotatable braking elements, Bourdon tubes adapted through internal pressure to force said braking elements into frictional contact, and means for supplying fluid pressure to said tubes.

2. In a hydraulic brake, the combination of co-operating rotatable and non-rotatable braking elements, Bourdon tubes disposed in actuating relation to said non-rotatable elements, and means for supplying fluid pressure to said tubes.

3. In a hydraulic brake, the combination of a rotatable brake drum, a fixed brake support, a braking element mounted on said support and movable into and out of friction contact with said drum, Bourdon tubes also mounted on said support in actuating relation to said braking element, and means for supplying fluid pressure to said tubes.

4. In a hydraulic brake, the combination of a rotatable brake drum, a fixed brake support, a braking element mounted on said support and movable into and out of friction contact with said drum, a tubular coupling mounted in said support, a pair of Bourdon tubes connected at one end into said coupling and closed at their other ends, and means for supplying fluid pressure to said coupling.

5. In a hydraulic brake, the combination of a rotatable brake drum, a fixed brake support, a pair of brake shoes pivoted on said support within said drum, a pair of Bourdon tubes disposed in said drum in thrust relation to said shoes, and means for supplying fluid pressure to said tubes.

6. An embodiment of claim 1 wherein the Bourdon tubes are formed with walls of gradually decreasing thickness from their open to their closed ends.

7. An embodiment of claim 1 wherein the Bourdon tubes are flattened and formed with walls of gradually decreasing thickness from their open to their closed ends.

PIERCE F. RICHARDS.